(12) United States Patent
Ozasa et al.

(10) Patent No.: US 10,543,474 B2
(45) Date of Patent: Jan. 28, 2020

(54) FLOW REACTOR

(71) Applicant: KANEKA CORPORATION, Osaka-shi (JP)

(72) Inventors: Shiori Ozasa, Takasago (JP); Tomoyuki Toyoda, Takasago (JP); Takahiro Ohishi, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 16/222,261

(22) Filed: Dec. 17, 2018

(65) Prior Publication Data

US 2019/0126230 A1 May 2, 2019

Related U.S. Application Data

(63) Continuation of application No. PCT/JP2017/023205, filed on Jun. 23, 2017.

(30) Foreign Application Priority Data

Jun. 24, 2016 (JP) ................... 2016-125837

(51) Int. Cl.
*B01J 19/00* (2006.01)
*B01J 19/24* (2006.01)
(Continued)

(52) U.S. Cl.
CPC .......... *B01J 19/0093* (2013.01); *B01J 14/00* (2013.01); *B01J 19/00* (2013.01); *B01J 19/02* (2013.01);
(Continued)

(58) Field of Classification Search
CPC ........ B01J 19/00; B01J 19/0093; B01J 19/24; B01J 19/2415; B01J 2219/00781; B01J 2219/00819; B01J 2219/00833; B01J 2219/00867; B01J 2219/0095–00954; B01J 2219/00961; B01J 2219/02; B01J 2219/0204; B01J 2219/0245; B01J 2219/025; B01J 2219/00272;
(Continued)

(56) References Cited

U.S. PATENT DOCUMENTS 3,824,115 A 7/1974 Segawa et al.
4,166,536 A 9/1979 Roberts et al.
(Continued)

FOREIGN PATENT DOCUMENTS

JP S48-17543 B2 5/1973
JP H04-177168 A 6/1992
(Continued)

OTHER PUBLICATIONS

International Search Report dated Aug. 8, 2017, in PCT/JP2017/023205, filed Jun. 23, 2017 (3 pages).
(Continued)

*Primary Examiner* — Natasha E Young
(74) *Attorney, Agent, or Firm* — Oblon, McClelland, Maier & Neustadt, L.L.P.

(57) ABSTRACT

A flow reactor having two or more raw material feeding units, a mixing unit to mix raw materials fed from the raw material feeding units, and a reactor unit in which a mixed solution prepared in the mixing unit flows, wherein at least a part of an inner wall of the reactor unit is formed of a fluororesin containing a conductive filler.

18 Claims, 7 Drawing Sheets

(51) Int. Cl.

| | | |
|---|---|---|
| | *C08K 3/04* | (2006.01) |
| | *C08K 3/08* | (2006.01) |
| | *C08K 3/22* | (2006.01) |
| | *C08L 27/12* | (2006.01) |
| | *H01B 1/22* | (2006.01) |
| | *H01B 1/24* | (2006.01) |
| | *B01J 19/02* | (2006.01) |
| | *B01J 14/00* | (2006.01) |

(52) U.S. Cl.
CPC .............. *B01J 19/2415* (2013.01); *C08K 3/04* (2013.01); *C08K 3/08* (2013.01); *C08K 3/22* (2013.01); *C08L 27/12* (2013.01); *H01B 1/22* (2013.01); *H01B 1/24* (2013.01); *B01J 2219/00272* (2013.01); *B01J 2219/00833* (2013.01); *B01J 2219/00867* (2013.01); *B01J 2219/00961* (2013.01); *B01J 2219/0245* (2013.01); *B01J 2219/1943* (2013.01); *B01J 2219/1944* (2013.01); *C08K 2003/085* (2013.01); *C08K 2003/0831* (2013.01); *C08K 2003/0856* (2013.01); *C08K 2003/0862* (2013.01); *C08K 2003/2231* (2013.01); *C08K 2003/2296* (2013.01)

(58) Field of Classification Search
CPC .............. B01J 2219/19; B01J 2219/194; B01J 2219/1941; B01J 2219/1943; B01J 2219/1944; C08K 3/00; C08K 3/02; C08K 3/04; C08K 3/08; C08K 3/18–22; C08K 2003/0831; C08K 2003/085; C08K 2003/0856; C08K 2003/0862; C08K 2003/2231; C08K 2003/2296; H01B 1/00; H01B 1/20; H01B 1/22; H01B 1/24
See application file for complete search history.

(56) References Cited

U.S. PATENT DOCUMENTS

| | | |
|---|---|---|
| 2005/0118372 A1 | 6/2005 | Bonnet et al. |
| 2005/0170121 A1 | 8/2005 | Bonnet et al. |
| 2005/0214184 A1 | 9/2005 | Chambers et al. |
| 2010/0068108 A1 | 3/2010 | Devic |
| 2011/0039093 A1 | 2/2011 | Fukumura |
| 2013/0217841 A1 | 8/2013 | Chiefari et al. |

FOREIGN PATENT DOCUMENTS

| | | |
|---|---|---|
| JP | 2005-162330 A | 6/2005 |
| JP | 2005-207582 A | 8/2005 |
| JP | 2005-525229 A | 8/2005 |
| JP | 2005-279493 A | 10/2005 |
| JP | 2007-136292 A | 6/2007 |
| JP | 2003-284942 A | 10/2007 |
| JP | 2009-095800 A | 5/2009 |
| JP | 2010-509061 A | 3/2010 |
| JP | 2013-543021 A | 11/2013 |
| JP | 2015-054431 A | 3/2015 |
| JP | 2015-178258 A | 10/2015 |
| WO | WO 2007/021818 A2 | 2/2007 |
| WO | WO 2009/022400 A1 | 2/2009 |

OTHER PUBLICATIONS

Extended European Search Report dated Nov. 18, 2019, in European Patent Application No. 17815513.1.

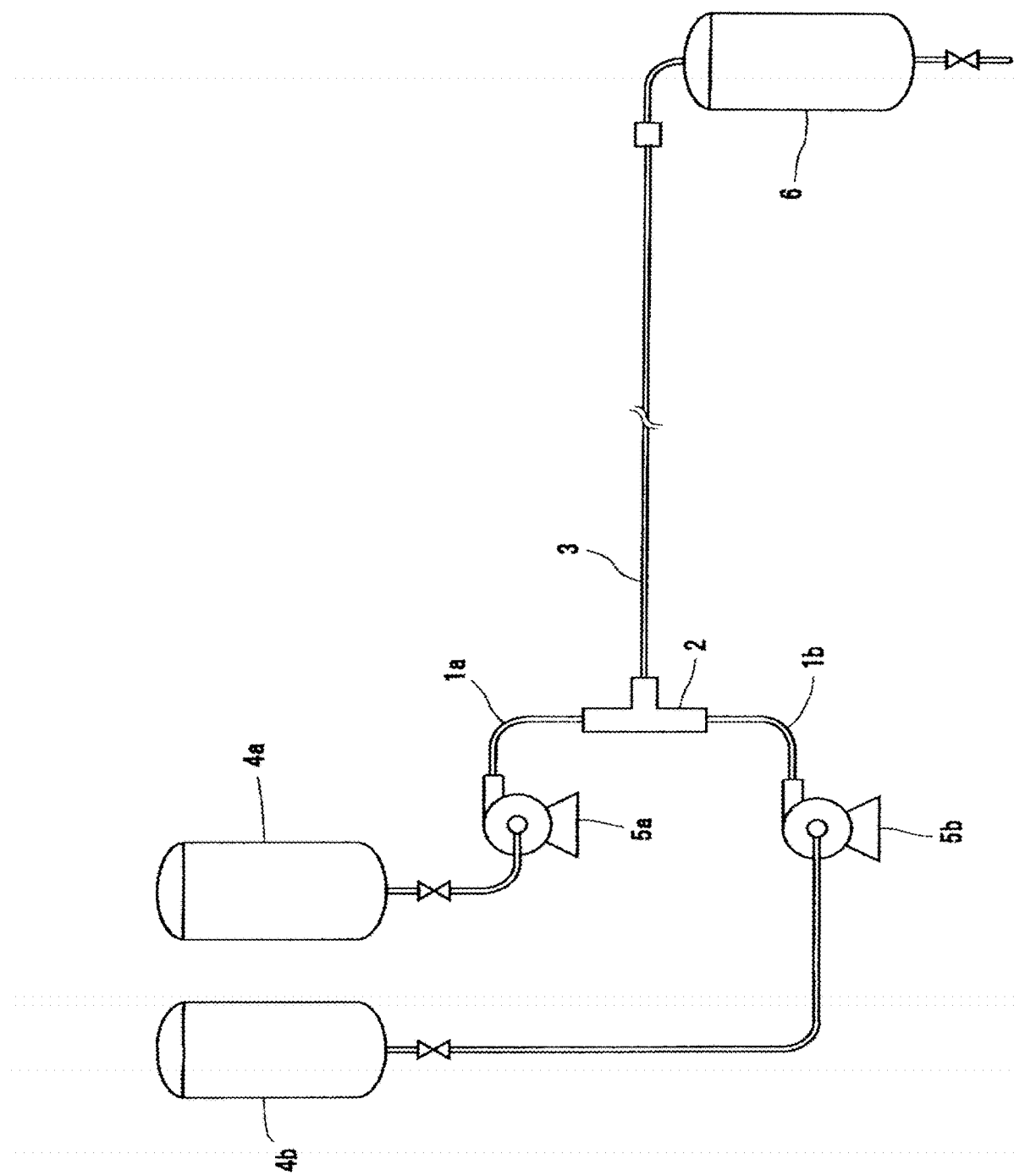
[FIG. 1]

[FIG. 2]
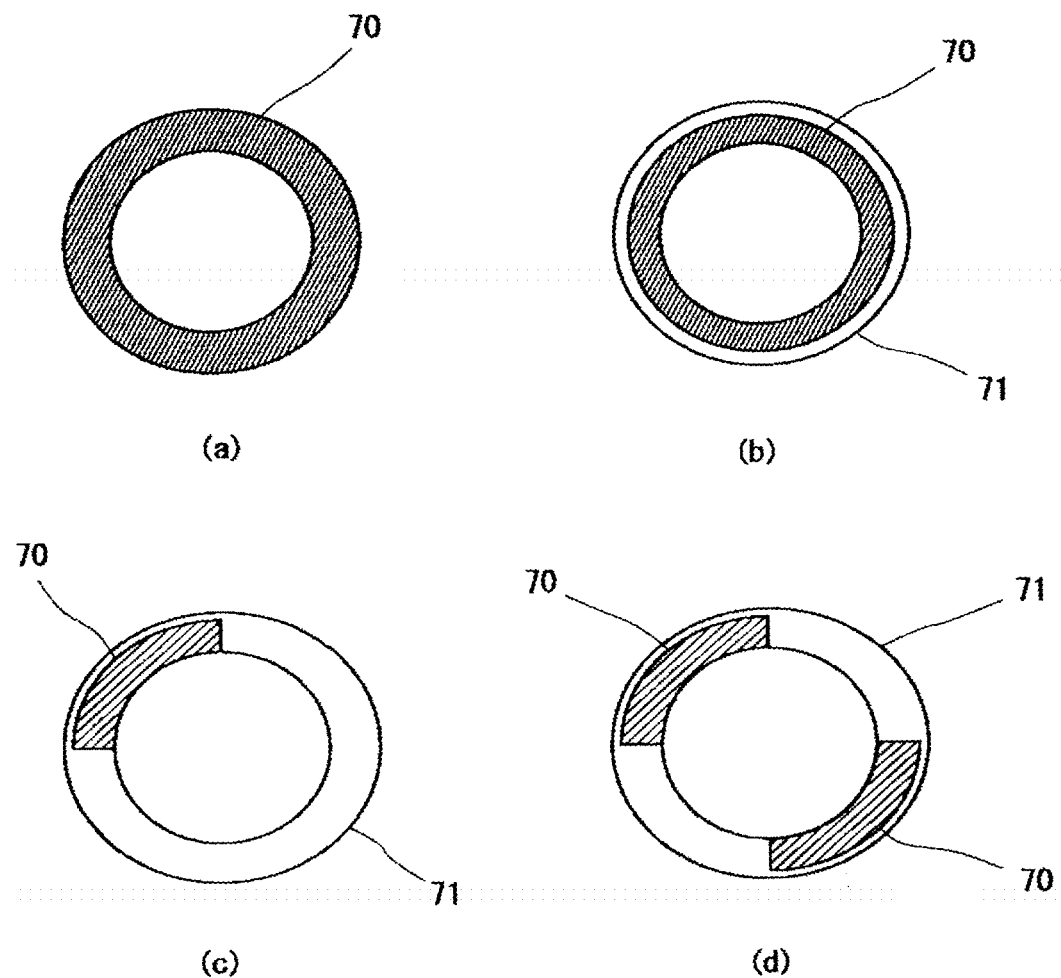

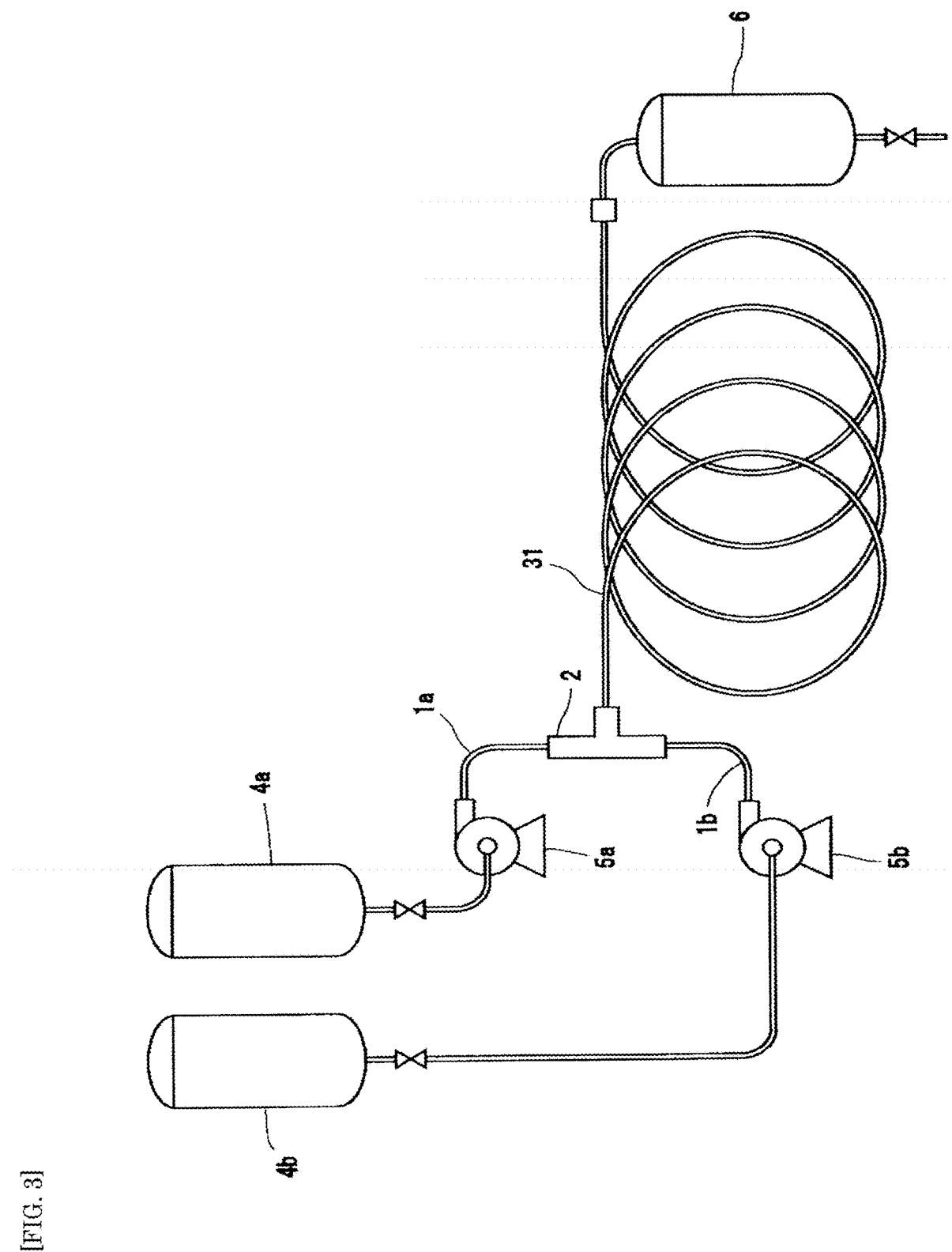
[FIG. 3]

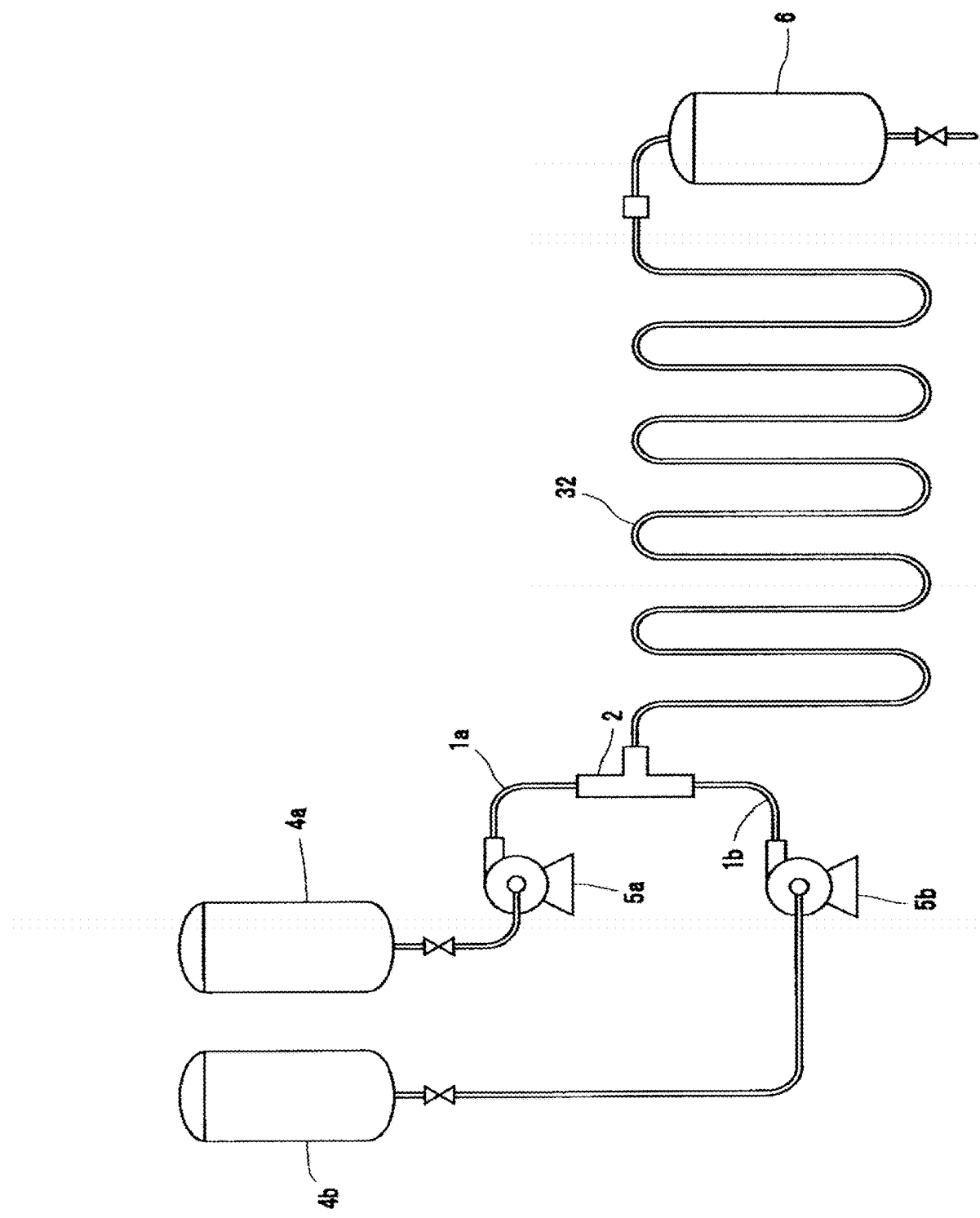
[FIG. 4]

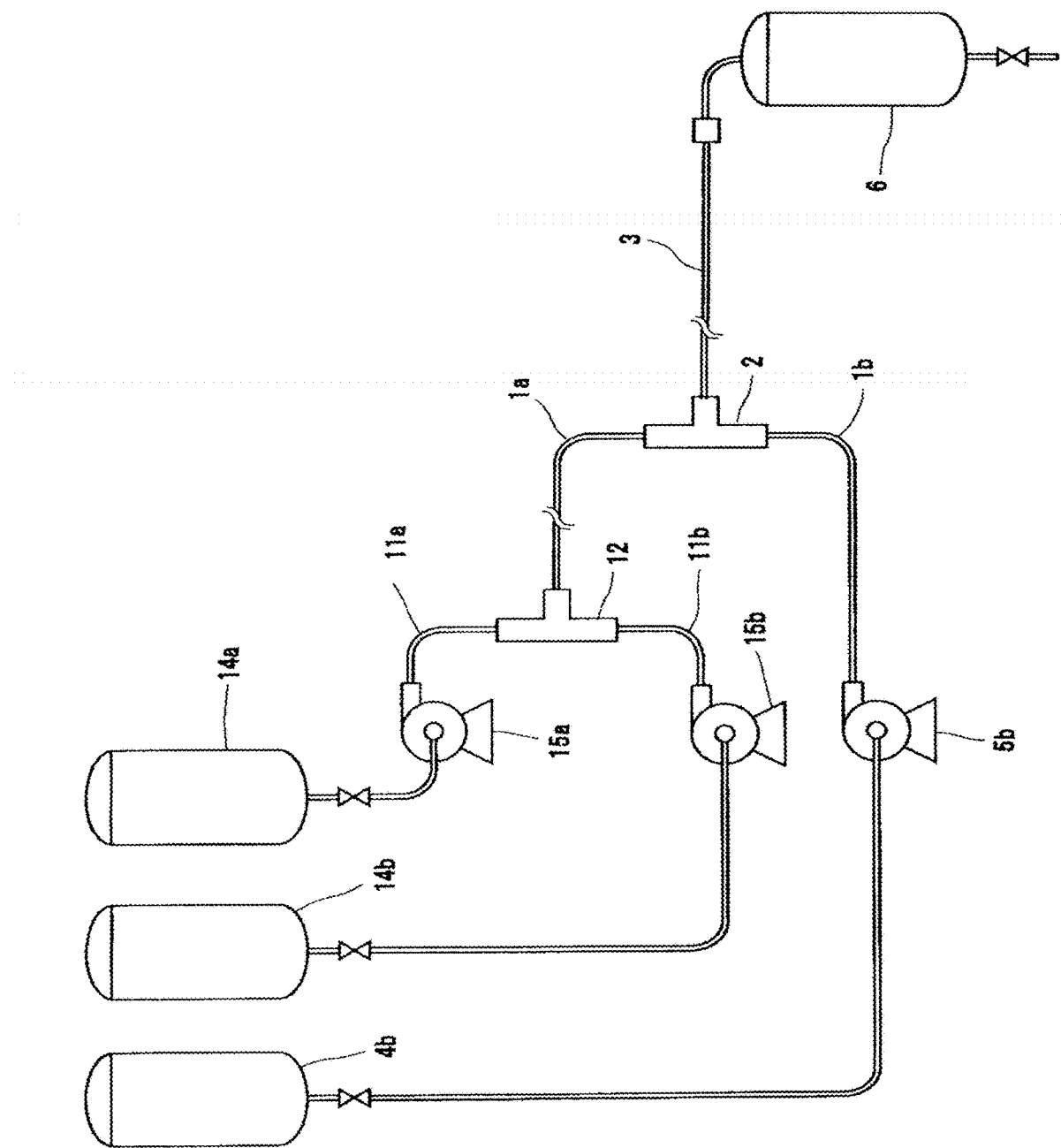
[FIG. 5]

[FIG. 6]
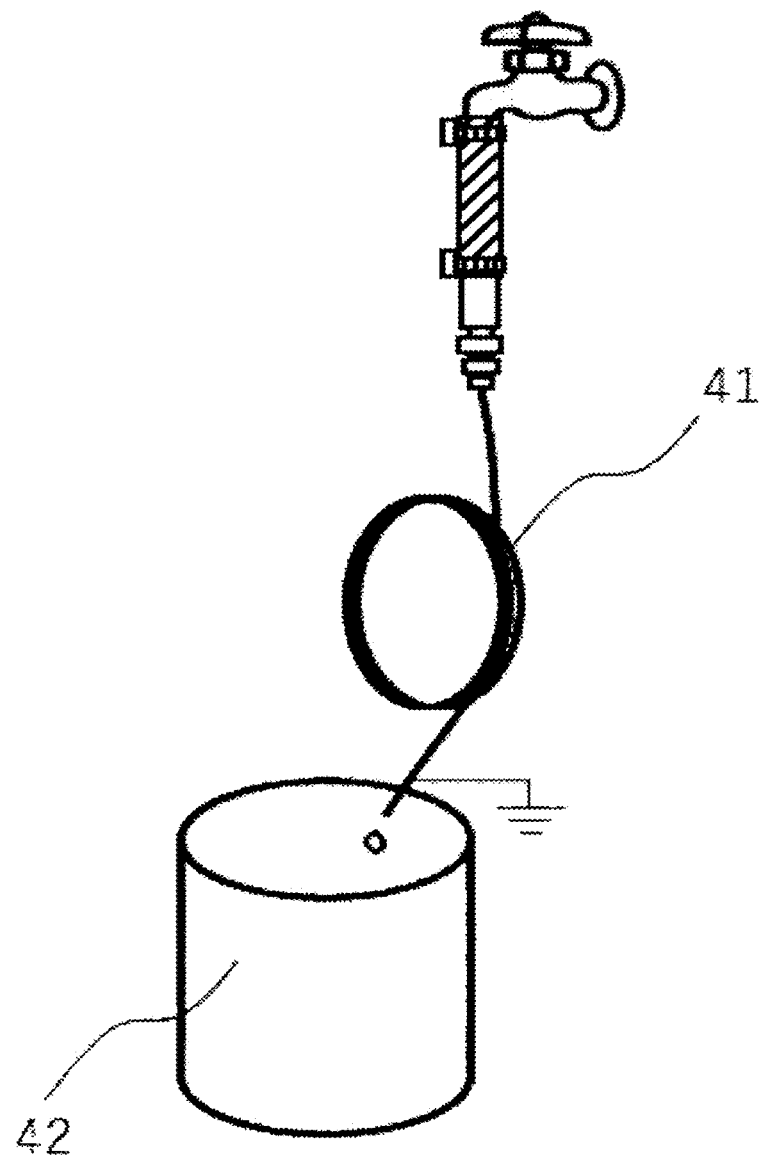

[FIG. 7]
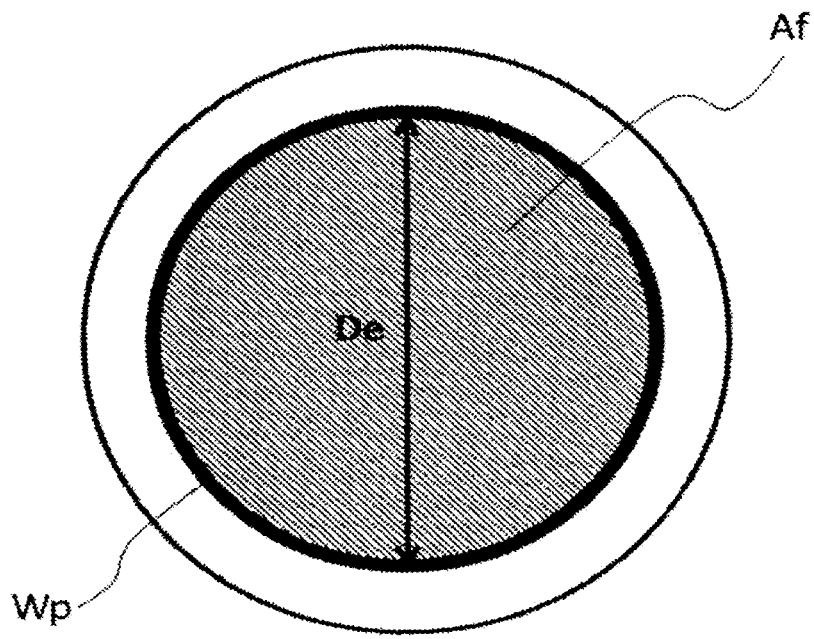
[FIG. 8]
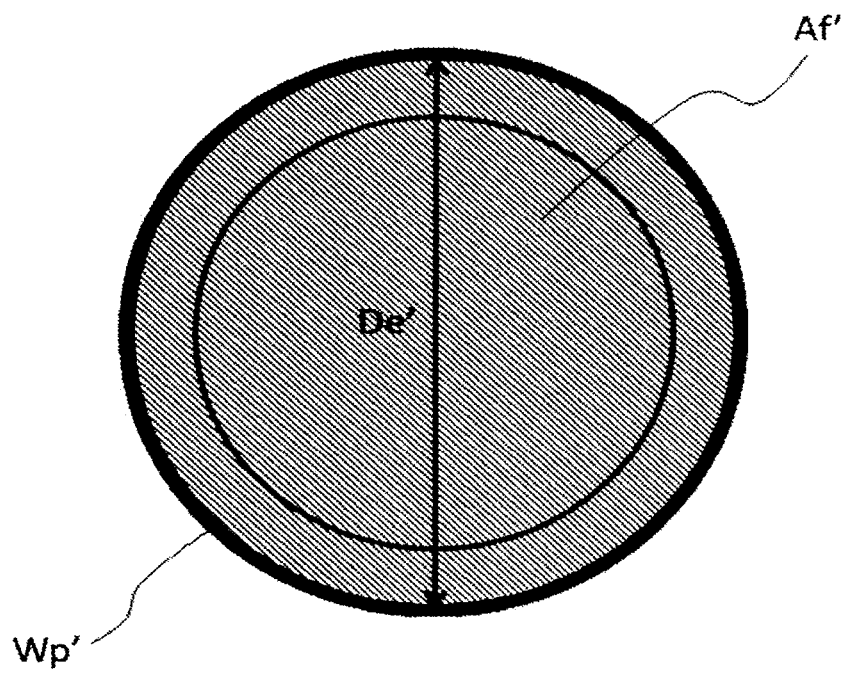

FLOW REACTOR

CROSS REFERENCE TO RELATED APPLICATIONS

This application is a continuation application of PCT/JP2017/023205, filed Jun. 23, 2017 and published as WO 2017/222048, which claims priority to Japanese application JP 2016-125837, filed Jun. 24, 2016.

TECHNICAL FIELD

The present invention relates to a flow reactor. More specifically, the present invention relates to a flow reactor wherein at least a part of the inner wall of a reactor unit is formed of a fluororesin containing a conductive filler.

BACKGROUND ART

A micro-flow reactor is a chemical reaction apparatus generally utilizing a microchannel in the order of submillimeter as a reaction field. The micro-flow reactor has attracted attention in recent years because it has specific effects, due to the micro reaction field, such as high-speed mixing performance (for example, when two liquids are mixed in a micro-space, the substance diffusion distance in the two liquids decreases, resulting in shortening the time of mass transfer movement), heat removal efficiency (since the reaction field is small, thermal efficiency is extremely high and temperature control is easy), reaction control performance, interface control performance, or the like. In addition, it is expected that the technology of the micro-flow reactor provides various effects such as improved safety and significantly reduced cost of equipment along with downsizing of the whole process, process intensification (micro in macro) by incorporating into existing processes, and production of substances that could not be produced by an existing production method.

However, a problem with the micro-flow reactor is that only a limited amount can be processed at a time. Therefore, process development of a flow reactor which can be practically used even if a processing amount increases is being carried out. The flow reactor is a chemical reaction apparatus in which the diameter of a flow channel is enlarged to the order of millimeters to centimeters to the extent that the characteristics of the micro-flow reactor are not impaired to enhance the operability. The flow reactor is mainly composed of a raw material feeding unit, a reaction unit, and an operation control unit, and as base materials for these units, inorganic materials such as metals, silicon, glass, and ceramic, or organic materials such as resins are generally used.

Patent Document 1 discloses a method for continuously producing polymers by polymerization of RAFT solution using a flow reactor, and the flow reactor is made of a polymer, metal, glass or combination thereof.

In the field of chemistry, there are many cases where a reaction solution contains a strong acid or a strong alkali, which is highly corrosive. As a product taking the corrosion into consideration, for example, Patent Document 2 discloses a microchannel structure in which glass, Teflon (registered trademark), a metal, or the like, which is resistant to a highly corrosive liquid such as an acid and alkali, is used for substrates.

Furthermore, as a process application, for example, Patent Document 3 discloses the fluororesin coated surfaces of loaded parts of a device such as a distillation column, in which a fluid containing an easily polymerizable substance are handled. And Patent Document 4 discloses a reactor having an inner metal wall having a fluoropolymer coating fixedly attached thereto.

Patent Document 5 discloses a structure for storing and transporting chemical products such as corrosive products, the structure having a multilayer structure including an inner layer of irradiation-grafted fluoropolymer and an outer layer of a polyolefin directly attached to the inner layer. Patent Document 6 discloses a multilayer pipe that is preferably used for transporting petrol, the multilayer pipe having a multilayer structure including an inner layer of irradiation-grafted fluoropolymer and an outer layer of a polyolefin directly attached to the inner layer. In addition, Patent Document 7 discloses a laminated tube composed of at least three layers including a layer formed of a fluorine-containing polymer.

PRIOR ART DOCUMENTS

Patent Document

Patent Document 1: JP 2013-543021 (A)
Patent Document 2: JP 2007-136292 (A)
Patent Document 3: JP 2003-284942 (A)
Patent Document 4: JP 2010-509061 (A)
Patent Document 5: JP2005-162330 (A)
Patent Document 6: JP 2005-207582 (A)
Patent Document 7: JP 2015-054431 (A)

SUMMARY OF THE INVENTION

Problems to be Solved by the Invention

According to "Recommendations for Requirements for Avoiding Electrostatic Hazards in Industry (2007)" issued by the National Institute of Occupational Safety and Health, Japan, in order to avoid the risk of electrostatic ignition, insulating piping must not be used for low conductivity liquids (<50 pS/m) such as gasoline, kerosene, and toluene. Therefore, when an organic solvent having a low dielectric constant is used as a reaction solvent, insulating materials such as glass, plastic, and ceramic as shown in Patent Documents 1 and 2 have not been able to be used for the flow reactor.

As materials that can be used with a substance having an electrostatic charge property such as the above organic solvent having a low dielectric constant and that is also excellent in corrosion resistance, metals and alloys such as stainless steel, titanium, Hastelloy and Monel can be given. However, since these materials are generally heavy and rigid, a relatively large number of workers, machines, working days, or costs has been required for assembly.

An object of the invention is to provide a flow reactor that enables the use of the substance having an electrostatic charge property such as the organic solvent having a low dielectric constant and that is also excellent in corrosion resistance.

Solutions to the Problems

As a result of intensive studies for achieving the above object, the inventors have found that by allowing at least a part of the inner wall of a reactor unit in a flow reactor to be formed of a fluororesin containing a conductive filler, the risk of electrostatic ignition is avoided, whereby it is possible to obtain the flow reactor that enables the use of the substance having an electrostatic charge property such as the organic solvent having a low dielectric constant and that is also excellent in corrosion resistance.

That is, the flow reactor according to the present invention has one or more features described below.

(1) A flow reactor comprising two or more raw material feeding units, a mixing unit to mix raw materials fed from the raw material feeding units, and a reactor unit in which a mixed solution prepared in the mixing unit flows, wherein at least a part of an inner wall of the reactor unit is formed of a fluororesin containing a conductive filler.
(2) The flow reactor according to (1), wherein the cross-section of the reactor unit has a single-layer structure comprising the fluororesin containing the conductive filler.
(3) The flow reactor according to (1) or (2), wherein a quenching agent of a reaction solution is in contact with an outer wall surface of the reactor unit.
(4) The flow reactor according to any one of (1) to (3), wherein the fluororesin is a homopolymer or a copolymer produced from a fluorine atom-containing monomer.
(5) The flow reactor according to any one of (1) to (4), wherein the conductive filler is at least one or more selected from a carbon-based filler, a metal-based filler, a metal oxide-based filler, and a metal alloy-based filler.
(6) The flow reactor according to any one of (1) to (5), wherein the fluororesin containing the conductive filler has a volume resistivity, measured under the conditions of 50% RH and 23° C. in accordance with JIS K 6911, of $10^6$ Ω·m or less.
(7) The flow reactor according to any one of (1) to (6), wherein a flow channel of the reactor unit has an equivalent diameter of 0.1 mm or more and 50 mm or less.
(8) The flow reactor according to any one of (1) to (7), comprising a temperature control unit.

Effects of the Invention

According to the flow reactor of the present invention, since at least a part of the inner wall is formed of the fluororesin containing the conductive filler, it is possible to use a substance having an electrostatic charge property and a corrosive substance. Moreover, in the case of the flow reactor, the whole process becomes compact. Therefore, the retaining amount of hazardous substances can be minimized, resulting in the improvement of safety. In addition, equipment costs can be drastically reduced, and thus a process with excellent competitiveness can be constructed.

BRIEF DESCRIPTION OF THE DRAWINGS

FIG. 1 is a schematic view showing an example of a flow reactor adopted in the present invention;
FIG. 2 is a cross-sectional view showing an example of a reactor unit in a flow reactor of the present invention;
FIG. 3 is a schematic view showing another example of a flow reactor adopted in the present invention;
FIG. 4 is a schematic view showing another example of a flow reactor adopted in the present invention;
FIG. 5 is a schematic view showing another example of a flow reactor adopted in the present invention;
FIG. 6 is a schematic view of an experimental apparatus used in Example and Comparative Example;
FIG. 7 is an explanatory schematic view of an equivalent diameter De of a flow channel; and
FIG. 8 is an explanatory schematic view of an outer equivalent diameter De'.

MODE FOR CARRYING OUT THE INVENTION

Hereinafter, the present invention will be described in more detail with reference to the drawings as necessary.
<Flow Reactor>
FIG. 1 is a schematic view showing an example of the configuration of a flow reactor adopted in the present invention, and the example shown in FIG. 1 is the most basic example. As sown in the basic example of FIG. 1, the flow reactor includes two or more raw material feeding units (two raw material feeding units 1a and 1b in the example shown in the drawing), a mixing unit 2 (T-shape mixer in the example shown in the drawing) to mix raw materials fed from the raw material feeding units, a reactor unit 3 in which a mixed solution prepared in the mixing unit 2 flows. A reaction proceeds while the solution is transferred through the reactor unit 3 (linear reactor unit in the example shown in the drawing).

In the example shown in FIG. 1, the raw material feeding units 1a and 1b are respectively connected to raw material storage containers 4a and 4b to store respective raw materials. The raw material feeding units 1a and 1b are respectively provided with liquid feeding control units (preferably diaphragm pumps) 5a and 5b, and the mixed solution flows in the reactor unit 3 by the pressure generated by these liquid feeding control units 5a and 5b. A reaction liquid discharged from the reactor unit 3 is temporarily stored in a reaction liquid storage container 6.
<Reactor Unit>

The flow reactor that can be adopted in the present invention as described above is characterized in that at least a part of the inner wall of the reactor unit is formed of a fluororesin containing a conductive filler. The fluororesin contains the conductive filler, so that the risk of electrostatic ignition can be avoided, whereby it becomes possible to fabricate a flow reactor that enables the use of the substance having an electrostatic charge property such as an organic solvent having a low dielectric constant and that is also excellent in corrosion resistance. Moreover, since a fluororesin is lightweight and soft, workers can flexibly bend the flow reactor and also perform a manual attachment at production sites, and hence there is an advantage in that workability is greatly improved. Furthermore, there are advantages in that a market price per unit length of a fluororesin is significantly low in comparison with alloys such as Hastelloy and Monel, and the replacement work is also simplified.

The volume resistivity of the fluororesin itself, which is usually $1.0 \times 10^{16}$ to $1.0 \times 10^{18}$ Ω·m (JIS K 6911; 50% RH, 23° C.), is higher than that of common thermoplastic resins such as polypropylene, and therefore the fluororesin tends to be charged easily alone. For this reason, in the present invention, the conductive filler is included in the fluororesin to reduce the risk of electrostatic ignition. In addition, using the fluororesin, it becomes possible to provide a process at a lower cost as compared with the case where a metal having excellent corrosion resistance is used.

It suffices that the conductive filler is contained in the fluororesin, and for example, it is desirable that the conductive filler be kneaded into the fluororesin. In the flow reactor, the linear velocity of a reaction liquid flowing through a flow channel tends to become high, and there is concern that the conductive filler may fall off due to friction between the reaction liquid and the inner wall. Therefore, in order to prevent the conductive filler from falling off, the conductive filler may be kneaded into the fluororesin. According to the investigation by the present inventors, it has been found that techniques for kneading a conductive filler in a resin to afford conductivity are commonly found in the field of electrophotography (for example, JP-A-2003-246927, JP-A-2015-55740, etc.), but have not yet been applied to the field of a flow reactor.

The fluororesin is a homopolymer or a copolymer produced from a fluorine atom-containing monomer. Examples of the homopolymer produced from a fluorine atom-containing monomer include polytetrafluoroethylene (PTFE), polychlorotrifluoroethylene (PCTFE), polyvinylidene-fluoride (PVDF), polyvinyl fluoride (PVF), and the like. Examples of the copolymer produced from a fluorine atom-containing monomer include perfluoroethylene propene copolymer (FEP), perfluoroalkoxyalkane (PFA), tetrafluoroethylene-perfluorodioxole copolymer (TFE/PDD), ethylene-chlorotrifluoroethylene copolymer (ECTFE), ethylene-tetrafluoroethylene copolymer (ETFE), tetrafluoroethylene-perfluoro (alkyl vinyl ether)-chlorotrifluoroethylene copolymer (CPT), ethylene-tetrafluoroethylene-hexafluoropropene copolymer (EFEP), and the like. These may be used singly or in combination of two or more.

From the viewpoint of chemical resistance, PTFE, PCTFE, FEP, PFA, ECTFE and ETFE are preferable, and PTFE, FEP and PFA are more preferable.

From the viewpoint of formability, PCTFE, PVF, FEP, PFA, ECTFE and ETFE are preferable.

In the present invention, since the fluororesin is used as the inner wall of the reactor unit, the fluororesin desirably has both chemical resistance and formability, and PFA is particularly preferable as the fluororesin.

Since the temperature of inside the reactor may rise depending on the type of reaction, a fluororesin with a higher melting point is preferable, and for example, the melting point is preferably 150° C. or higher, more preferably 200° C. or higher, and further preferably 240° C. or higher. The upper limit thereof is not particularly limited, but is usually 350° C. or lower.

As the conductive filler, a metal or carbon, which is known as a conductor, can be used. Specific examples thereof include carbon-based fillers such as carbon black, ketjen black, acetylene black, carbon nanotubes, natural graphite, artificial graphite, and vapor-grown carbon fibers; metal-based fillers such as gold, silver, nickel, copper, zinc, aluminum, and stainless steel; metal oxide-based fillers such as aluminum-doped zinc oxide, antimony-doped tin oxide (Iv), and tin-doped indium oxide (III); and metal alloy-based fillers such as AgCu, AgSn, CuZn, CuNiZn, and CuNi. These may be used singly or in combination of two or more. The reactor unit containing the fluororesin is inferior in durability as compared with a reactor unit made of a metal, and hence when the reactor unit containing the fluororesin is used, the frequency of replacement of the reactor unit tends to rise as compared with the case of using the reactor unit made of a metal. Therefore, the conductive filler used in the reactor unit is preferably a carbon-based filler, which has easy availability, excellent conductivity and compatibility with chemical reagent.

There is no particular limitation on the shape of the conductive filler, and the conductive filler is preferably in the shape of a sphere or needle. When the conductive filler is in the shape of a sphere, the lower limit of the average particle size of the conductive filler is preferably 5 nm or more, and more preferably 10 nm or more. The upper limit of this average particle size is preferably 500 nm or less, and more preferably 100 nm or less. The average particle size can be evaluated based on an average value of particle diameters measured by a laser diffraction/scattering method, which is a general technique, or measured by using scanning microscope photographs for 100 to 1000 randomly selected fillers.

In order to exert a higher conductivity effect, the conductive filler is preferably in the shape of a needle that facilitates the formation of a conductive path. The lower limit of the aspect ratio (length/diameter of a filler) of the conductive filler in the shape of a needle is preferably 5 or more, and more preferably 10 or more. The upper limit of this aspect ratio is preferably 500 or less, and more preferably 100 or less.

In the fluororesin containing the conductive filler, the content of the conductive filler is preferably 5 parts by weight or more, and more preferably 7 parts by weight or more in 100% by weight of the fluororesin. The upper limit of the content of the conductive filler is preferably 30 parts by weight or less, and more preferably 20 parts by weight or less.

The fluororesin containing the conductive filler is excellent in antistatic properties and has a volume resistivity (JIS K 6911; 50% RH, 23° C.) of preferably $10^6$ Ω·m or less, more preferably $10^5$ Ω·m or less, and further preferably $10^4$ Ω·m or less. The lower limit of the volume resistivity of the fluororesin containing the conductive filler is not particularly limited, but is usually 0 Ω·m or more. By adjusting the volume resistivity of the fluororesin containing the conductive filler within the above range, a solvent having a low dielectric constant can also be used in the reactor unit. The surface resistivity (JIS K 6911; 50% RH, 23° C.) of the fluororesin containing the conductive filler is preferably $10^6$Ω or less, and more preferably $10^5$Ω or less. The lower limit thereof is not particularly limited, but is usually 0Ω or more. By adjusting the surface resistivity within the above range, a reactor unit having a high antistatic effect can be obtained.

The "at least a part of the inner wall of the reactor unit is formed of a fluororesin containing a conductive filler" specifically means that the fluororesin containing the conductive filler is present in at least a part of the inner wall surface of the reactor unit that is in contact with a content liquid contained in the reactor unit. FIGS. 2(a) to 2(d) show preferred embodiments in which at least a part of the inner wall is formed of the fluororesin containing the conductive filler. In FIGS. 2(a) to 2(d), a reactor unit being the shape of a tube and having circular cross section are taken as examples, and the cross sections of the reactor unit are illustrated but the shape of the cross-section of the reactor unit is not limited to these examples. It is preferable that the inner wall of the reactor unit be configured such that the entire inner wall of the reactor unit is formed of a fluororesin 70 containing a conductive filler as shown in FIG. 2(a) and FIG. 2(b), or such that a part of the inner wall of the reactor unit is formed of the fluororesin 70 containing the conductive filler, and the remaining part of the inner wall is formed of a second resin 71 as shown in FIG. 2(c) and FIG. 2(d). In the present invention, from the viewpoint of preventing materials contained in the reactor unit from chopping off or preventing liquid leakage, a smaller number of joints between the fluororesin 70 containing the conductive filler and the second resin 71 is preferable. Therefore, it is more preferable that the inner wall of the reactor unit be configured such that the entire inner wall of the reactor unit is formed of the fluororesin 70 containing the conductive filler (FIG. 2(a) and FIG. 2(b)).

Furthermore, the whole of the reactor unit may be formed of the fluororesin 70 with conductivity as shown in FIG.

2(a), or the reactor unit may be formed of the fluororesin 70 with conductivity and the second resin 71 as shown in FIGS. 2(b) to 2(d).

The second resin 71 may cover the outer circumferential surface of the reactor unit (FIGS. 2(b) to 2(d)) and may form a part of the inner wall of the reactor unit (FIG. 2(c) and FIG. 2(d)). When the second resin 71 covers the outer circumferential surface of the reactor unit, grounding needs to be established at an appropriate point such as a midpoint of a flow channel or a connecting portion to dissipate static electricity generated on the inner wall of the flow channel to the outside. To simplify the apparatus, it is preferable to dissipate static electricity to the outside by covering a part of the outer circumference of the reactor unit with the fluororesin 70 with conductivity or by connecting a mixing unit made of the fluororesin 70 with conductivity or a metal and/or a discharge unit made of a metal to the reactor unit and grounding the mixing unit and/or the discharge unit.

When the inner wall of the reactor unit is formed of the fluororesin 70 with conductivity and the second resin 71 (FIG. 2(c) and FIG. 2(d)), the number of the joints between the fluororesin 70 and the second resin 71 increases, so that there is a possibility that the contents such as reaction raw materials and products contained in the reactor unit may leak out of the reactor unit from the joints. Therefore, in order to improve the safety of the reactor unit, it is effective that the outer circumferential surface of the reactor unit is covered with the second resin 71 as shown in FIGS. 2(c) and 2(d).

The second resin (excluding the fluororesin containing the conductive filler), for example, a fluororesin containing no conductive filler is preferably used, and as such a fluororesin, the same fluororesins as the above-mentioned fluororesins can be used. The fluororesin is also used as the second resin, whereby the reactor unit excellent in chemical resistance can be obtained. In order to enhance the antistatic effect of the reactor unit, the fluororesin containing the conductive filler is preferably exposed at a degree of 50% or more, more preferably 70% or more, further preferably 90% or more, and particularly preferably 100% of the inner wall surface.

The cross-section of the reactor unit may have a single-layer structure composed of the fluororesin containing the conductive filler (FIG. 2(a)) or a multilayer structure composed of the fluororesin containing the conductive filler (FIGS. 2(b) to 2(d)). From the viewpoint of improving the antistatic effect, the cross-section of the reactor unit desirably has a single-layer structure composed of the fluororesin containing the conductive filler.

There is no particular limitation on the shape of the reactor unit as long as the reactor unit is in a shape through which a reaction liquid can flow. As examples of the shape of the reactor unit, a hollow and columnar tube-type reactor, and a laminate-type reactor having a substrate in which a groove corresponding to a flow channel is formed by etching or the like can be given. In the tube-type reactor, the cross section of a flow channel may be circular, polygonal, or distorted circular (for example, convex or concave), and the circular or polygonal cross section is more preferable. The tube-type reactor may have a single-tube structure or a multiple-tube structure in which an inner tube is inserted into an outer tube like a double-cylindrical tube.

The length of the reactor unit is preferably 1 cm or more, and more preferably 10 cm or more. The upper limit of the length of the reactor unit is not particularly limited, but is preferably 500 m or less, and more preferably 300 m or less. When the shape of the reactor unit is adjusted as mentioned above, the contents in the reactor unit are easy to come into contact with the inner wall of the reactor unit, and thus even if a solvent with a low dielectric constant, which can be easily charged, problems caused by electrostatic charge can be prevented. The shape and length of the reactor unit may be appropriately determined according to a retention time and the like.

When the reactor unit is in the shape of a tube, the length of the tube is preferably twice or more, more preferably 10 times or more, and further preferably 15 times or more the equivalent diameter of the flow channel. The upper limit of the length of the tube is not particularly limited, but is preferably 10,000 times or less, more preferably 5,000 times or less, and further preferably 3,000 times or less the equivalent diameter of the flow channel. Adjusting the size of the tube within the above range makes it easier for the contents to come into contact with the inner wall of the reactor unit, and problems caused by electrostatic charge can be prevented.

The equivalent diameter of the flow channel of the reactor unit is preferably 50 mm or less, more preferably 20 mm or less, and further preferably 15 mm or less. In view of pressure drop and processing amount, it is preferably 0.1 mm or more, more preferably 1.0 mm or more, and further preferably 1.5 mm or more.

In the present invention, the "equivalent diameter of the flow channel" indicates a diameter of a circular tube regarded as equivalent to the cross section of the flow channel. That is, the equivalent diameter De of the flow channel is represented by the following formula (i);

$$De = 4Af/Wp \tag{i}$$

(wherein Af is a cross sectional area of a flow channel, and Wp is a wet perimeter (the length of the wall in the cross section); see FIG. 7).

The number of flow channels in the reactor unit is not particularly limited, and one or two or more (preferably, ten or less) flow channels are provided. When two or more flow channels are provided in the reactor unit, the reactor unit may have a structure in which, from the upstream side toward the downstream side, two or more (preferably two) flow channels merge into one flow channel, or a structure in which, from the upstream side toward the downstream side, one flow channel branches into two or more (preferably two) flow channels. It is desirable that two or more flow channels be provided more preferably in a tournament format.

In a flow reactor having a plurality of reactor units, the inner walls of the reactor units in all the flow channels are not necessarily formed of the fluororesin with conductivity. For example, there are cases where reactions occur in multiple stages, and as a result of the reactions, the reaction product may have conductivity or may lose corrosivity. Therefore, depending on the properties of the liquid after the reactions, the inner wall of the reactor unit may be formed of a material other than the fluororesin with conductivity. In such a case, the inner wall of the reactor unit is preferably formed of, for example, inorganic substances such as metals, silicon, glass and ceramic, or organic substances such as resins according to the characteristics of the reaction product.

The equivalent diameter of the flow channel of the reactor unit may be uniform throughout the whole reactor unit or may be changed in the middle of the reactor unit. If the equivalent diameter of the flow channel of the reactor unit is uniform, the reaction proceeds evenly without the flow of the reaction liquid being hindered. On the other hand, taking various conditions such as mixing performance and heat removal efficiency into consideration, the equivalent diameter of the flow channel of the reactor unit may be changed in the middle of the reactor unit. The equivalent diameter of the flow channel may be changed at an arbitrary position, the number of times of changing the equivalent diameter of the flow channel is not limited, and the equivalent diameter of the flow channel may be changed once or twice or more as necessary. Furthermore, the equivalent diameter of the flow channel may be gradually changed or may be greatly changed with a certain point being as the border. The equivalent diameter of the flow channel may be smaller or may be larger than the equivalent diameter of the flow channel on the upstream side, and may be appropriately designed according to the reaction. The design of the flow channel is not limited to the following example. However, for example, since the mixing efficiency improves as the equivalent diameter of the flow channel of the reactor unit decreases, it is also possible that the equivalent diameter of the flow channel of the reactor unit positioned after the mixing unit is made small, and after sufficient mixing, the equivalent diameter of the flow channel of the reactor unit is made large.

When the reactor unit is in the shape of a tube, the tube thickness of the reactor unit also may be uniform throughout the whole reactor unit or may be changed in the middle of the reactor unit. If the tube thickness of the reactor unit is made thin, the structure in which heat can be easily removable, and heat removal efficiency improves. If the tube thickness of the reactor unit is thin, the cooling efficiency also increases.

When the reactor unit is in the shape of a tube, the outer diameter of the reactor unit may also be uniform throughout the whole reactor unit or may be changed in the middle of the reactor unit. Since the heat removal efficiency improves as the outer diameter of the reactor unit decreases, for example, for a portion requiring a precise temperature control, both the equivalent diameter of the flow channel of the reactor unit and the outside diameter of the reactor unit may be decreased. Alternatively, by increasing only the equivalent diameter of the flow channel and making the outer diameter of the reactor unit uniform, the tube thickness of the reactor unit is made thin, so that the structure in which can be heat easily escapes can be obtained.

The outer diameter of the reactor unit in the present invention refers to the outer equivalent diameter of the tube-type reactor. In the present invention, the "outer equivalent diameter" refers to a diameter of a circular tube regarded as equivalent to the cross section of the tube-type reactor. That is, the outer equivalent diameter De' of the tube-type reactor is represented by the following formula (ii):

$$De'=4Af'/Wp' \quad (ii)$$

(wherein Af' is a cross sectional area of a tube-type reactor, and Wp' is a circumference of a tube-type reactor; see FIG. 8).

In addition, the tube thickness of the reactor unit indicates the thickness of the fluororesin with conductivity and/or other materials constituting the flow channel of the tube-type reactor.

When the equivalent diameter of the flow channel is uniform throughout the whole reactor unit, for example, the ratio ($D_{max}/D_{min}$) of the maximum equivalent diameter ($D_{max}$) to the minimum equivalent diameter ($D_{min}$) in the reactor unit is preferably 1.10 times or less, more preferably 1.05 times or less, further preferably 1.01 times or less, and preferably 1.0 times or more.

When changing the equivalent diameter of the flow channel of the reactor unit in the middle, for example, the ratio ($D_{max}/D_{min}$) of the maximum equivalent diameter ($D_{max}$) to the minimum equivalent diameter ($D_{min}$) is preferably 1.10 times or more, more preferably 1.20 times or more, and further preferably 1.30 times or more. The upper limit of the ratio is preferably 10 times or less, and more preferably 5 times or less.

When the outer equivalent diameter of the flow channel of the reactor unit is small, the pressure drop increases, so that it is necessary to increase the strength of apparatus. Therefore, it is desirable to make the outer equivalent diameter of the flow channel of the reactor unit as large as possible so that the load in terms of safety and cost does not become excessive, except for the portion where outer equivalent diameter needs to be small.

Although the reactor unit 3 is preferably line shape, it does not necessarily have to be in the shape of a straight line as shown in FIG. 1. For example, the reactor unit may be a reactor unit 31 wound in the shape of a spiral or coil as shown in FIG. 3, or may be a reactor unit 32 with several bent backs as shown in FIG. 4. By configuring the reactor unit in a non-linear shape, minimizing of the flow reactor can be achieved. The reactor unit 3 is preferably in a shape with an unvaried curvature like the shape of a straight line, spiral, coil, or the like. Non-uniformity in flow can be prevented by making the reactor unit in the shape having an unvaried curvature. The axial direction of the spiral or coil is not particularly limited, and may be parallel to the direction of gravity or perpendicular to the direction of gravity, but is more preferably parallel to the direction of gravity.

The reactor unit has a reactor inlet for introducing a raw material into the reactor unit and a reactor outlet for discharging a product produced in the reactor unit to the outside of the reactor unit. The installation positions of the reactor inlet and the reactor outlet are not particularly limited. The reactor inlet may be placed at the same height as the reactor outlet, at a position higher than the position of the reactor outlet, or at a position lower than the position of the reactor outlet. In the present invention, since at least a part of the inner wall of the reactor unit is formed of the fluororesin containing the conductive filler, it is desirable that a reaction liquid containing a solvent with a low dielectric constant can contact the inner wall of the reactor unit as much as possible. For this reason, the reactor inlet is desirably placed at a position lower than the position of the reactor outlet. If the reactor inlet is placed at a position lower than the position of the reactor outlet, bubbles contained in the reaction liquid are entrained by the flow of the reaction liquid and discharged from the upper part of the reactor unit, so that bubbles hardly adhere to the inner wall of the reactor unit. As a result, it is possible to efficiently bring the reaction liquid into contact with the inner wall of the reactor unit.

As described above, when the number of the joints between the fluororesin and the second resin increases, there is a possibility that solution in the reactor unit may leak out of the reactor unit through the joints. In addition, the fluororesin tends to have a lower contents' hermeticity than that of other flexible resins, and even when the cross-section of the reactor unit has a single-layer structure composed of the fluororesin containing the conductive filler, there is a risk that the inner solution may ooze out through the fluororesin to the outside. Therefore, depending on the type of the reaction solution, when a toxic substance such as acrylonitrile, acrolein, sulfur dioxide gas, arsine, ammonia, carbon monoxide, chlorine, chloromethine, chloroprene, arsenic pentafluoride, phosphorus pentafluoride, ethylene oxide, nitrogen trifluoride, boron trifluoride, phosphorus trifluoride, hydrogen cyanide, diethylamine, disilane, sulfur tetrafluoride, silicon tetrafluoride, diborane, hydrogen selenide, trimethylamine, carbon disulfide, fluorine, bromomethyl, phosgene, phosphine, monogermane, monosilane, monomethylamine, or hydrogen sulfide is used, the outer wall surface of the reactor unit may be brought into contact with a quenching agent. Even if the reaction solution oozes out, safety can be ensured by using a quenching agent.

As the quenching agent, water; an acidic aqueous solution containing at least one acid selected from hydrochloric acid, sulfuric acid, phosphoric acid, acetic acid, citric acid and the like; an alkaline aqueous solution containing at least one base selected from sodium hydroxide, potassium carbonate and sodium hydrogen carbonate; an oxidizing aqueous solution such as hydrogen peroxide, a sodium hypochlorite aqueous solution, a sodium chlorite aqueous solution or the like; a reducing aqueous solution such as a sodium thiosulfate aqueous solution, sodium sulfite aqueous solution or the like can be exemplified.

<Raw Material Feeding Unit>

The flow reactor adopted in the present invention may have two or more (for example, three) raw material feeding units according to a reaction method. As shown in FIG. 5, raw materials fed from either one or both raw material feeding units may be a resultant product obtained by preliminarily mixing other raw materials 14a and 14b in a premixer 12 and then reacting them as necessary. Although not shown, the reaction liquid discharged from the reactor unit 3 may be used as a raw material for a subsequent flow reactor. The reaction raw materials (including the preliminary reactant) are fed into the flow reactor through these raw material feeding units. The reaction raw materials are usually fed in the form of liquid (including solution).

As described above, the reaction raw materials are preferably fed by a liquid feeding control unit such as a diaphragm pump. The number of liquid feeding control units is not particularly limited and may be equal to or greater than or less than the number of the raw material feeding units. The liquid feeding control unit is not limited to a pump, and for example, a pressurized container to charge a reaction raw material can also be used as the liquid feeding control unit.

The raw material feeding unit is preferably a tube, and the inner diameter of the tube is preferably 0.01 mm or more, more preferably 0.1 mm or more, and preferably 50 mm or less. One end of the raw material feeding unit is connected to a raw material feeding port and the other end is connected to the mixing unit.

<Mixing Unit>

The mixing unit is a unit to mix raw materials, and is placed, for example, between the ends of two or more raw material feeding units and the reactor inlet. The mixed solution obtained in the mixing unit is fed as a reaction liquid into the reactor unit through the reactor inlet. The mixing unit is preferably a tube, and the inner diameter of the tube is preferably 0.01 mm or more and 50 mm or less.

A known mixer may be provided in the mixing unit in order to sufficiently stir the raw materials. Examples of such a mixer include a T-shape mixer, a Y-shape mixer, a static mixer, a helix-type mixer, and the like.

<Discharge Unit>

It is desirable that a discharge unit be connected to the reactor outlet. The discharge unit is a unit through which products produced in the reactor unit and unreacted raw materials flow. The discharge unit is also preferably a tube, and the inner diameter of the tube is preferably 0.01 mm or more, more preferably 0.1 mm or more, and preferably 50 mm or less. It is desirable that the reaction solution collected from the discharge unit be appropriately processed thereafter.

The raw material feeding unit, the mixing unit and the discharge unit are preferably made from a metal such as stainless steel, Hastelloy, titanium, copper, nickel, or aluminum; an inorganic material such as glass or ceramic; or a resin such as PEEK resin, silicone resin, or fluororesin. Electrical conductivity may be imparted to the resin. From the viewpoint of corrosion resistance, heat resistance and durability, the metal, particularly Hastelloy, is preferable. The raw material feeding unit, the mixing unit, and the discharge unit may have either a single-layer structure or a multilayer structure. From the viewpoint of prevention of liquid leakage, at least one or all of the raw material feeding unit, the mixing unit, and the discharge unit desirably have a multilayer structure.

Since the shape of the mixing unit sometimes becomes complicated, when precise processing is required, it is advisable to use a metal or resin having good workability.

<Temperature Control Unit>

The flow reactor has a larger specific surface area and better heat transfer performance as compared with those of a batch reactor, and thus temperature control can be performed quickly. Therefore, the flow reactor is desirably provided with a temperature control unit. The temperature control unit is preferably capable of adjusting a temperature of at least one of the raw material feeding unit, the mixing unit, and the reactor unit. For example, at least one of the raw material feeding unit, the mixing unit, and the reactor unit may be immersed in a heating medium of which temperature can be controlled, or at least one of the raw material feeding unit, the mixing unit, and the reactor unit may be configured in a multilayer structure (for example, a two-layer tube or the like) to control the temperature from the inner side, the outer side, or both sides of the layers. Due to the presence of the temperature control unit, reaction yields and quality can be improved in a system that initiates a reaction by heat, a system that lowers a temperature to suppress a by-product formation, and the like.

<Method of Use>

The flow reactor of the present invention can be used, for example, for a chemical reaction operation, an extraction operation, a separation operation, a purification operation, or the like, which is an example of a chemical reaction operation for a fluid.

Examples of reaction solvents that can be used in the flow reactor of the present invention include an aliphatic hydrocarbon-based solvent such as n-hexane, cyclohexane, or methylcyclohexane; an aromatic hydrocarbon-based solvent such as benzene, toluene, or xylene; an ether-based solvent such as diethyl ether, diisopropyl ether, tetrahydrofuran, 2-methyltetrahydrofuran, 4-methyltetrahydropyran, methyl tert-butyl ether, 1,4-dioxane, or cyclopentyl methyl ether; a halogen-based solvent such as methylene chloride, chloroform, 1,1,1,-trichloroethane, or chlorobenzene; an ester-based solvent such as ethyl acetate, propyl acetate, or butyl acetate; a ketone-based solvent such as acetone, methyl ethyl ketone, or methyl isobutyl ketone; a nitrile-based solvent such as acetonitrile, propionitrile, or butyronitrile; and an amide-based solvent such as N,N-dimethylformamide, N,N-dimethylacetamide, or N-methylpyrrolidone. These reaction solvents may be used singly or in combination of two or more.

In the flow reactor of the present invention, various chemical reactions can be performed, and there is no particular limitation on the chemical reaction. Since a reaction in the flow reactor is performed in a highly closed system, the flow reactor can be also applied to a reaction using a hazardous chemicals such as acrylonitrile, acrolein, sulfur dioxide gas, arsine, ammonia, carbon monoxide, chlorine, chloromethine, chloroprene, arsenic pentafluoride, phosphorus pentafluoride, ethylene oxide, nitrogen trifluoride, boron trifluoride, phosphorus trifluoride, hydrogen cyanide, diethylamine, disilane, sulfur tetrafluoride, silicon tetrafluoride, diborane, hydrogen selenide, trimethylamine, carbon disulfide, fluorine, bromomethyl, phosgene, phosphine, monogermane, monosilane, monomethylamine, or hydrogen sulfide.

The temperature in the reactor unit during a reaction is not particularly limited as long as it is equal to or lower than the boiling point of the reaction solvent and equal to or higher than the freezing point of the reaction solvent, and preferably −80° C. or higher, more preferably −60° C. or higher, further preferably −40° C. or higher, preferably 200° C. or lower, more preferably 180° C. or lower, and further preferably 160° C. or lower.

The flow rate of the reaction solution in the reactor unit is preferably 2 m/s or less, more preferably 1 m/s or less, and further preferably 0.8 m/s or less in order to suppress friction and prevent charging.

The reaction time (retention time) is preferably 60 minutes or less, more preferably 30 minutes or less, further preferably 15 minutes or less.

This application claims the benefit of priority to Japanese Patent Application No. 2016-125837 filed on Jun. 24, 2016, the entire disclosure of which is incorporated by reference herein.

EXAMPLES

The present invention will be more specifically explained below with reference to specific examples; however, the present invention is not restricted by the below examples and can be put into practice after appropriate modifications within a range meeting the gist of the above and the below, all of which are included in the technical scope of the present invention.

Example 1

FIG. 6 shows a schematic view of an experimental apparatus. A flow channel (hereinafter referred to as "conductive Teflon tube"; volume resistivity: 3.0 Ω·m; inner diameter: 2.0 mm×outer diameter: 3.0 mm×length: 2.6 m) 41 that was formed of PFA having a carbon-based conductive filler and had a cross-section of a single-layer structure was wound into coil form with a diameter of 80 mm, and one end of the flow channel 41 was connected to a water tap. The ground was mounted on a position 3 cm inward from the discharge port of the conductive Teflon tube 41 in order to release the static electricity that traveled on the surface of the tube 41 to the outside. In addition, a 2 liters disposable cup 42 made of polypropylene, which has high insulation properties, was placed near the discharge port of the conductive Teflon tube 41.

Water was sent into the conductive Teflon tube 41 at a volumetric flow rate shown in Table 1, and water flowing out from the conductive Teflon tube 41 was stored in the disposable cup 42. The water was shut off when the amount of water in the disposable cup 42 reached the liquid feed amount shown in Table 1, and the surface potential of the water stored in the disposable cup 42 was measured with a surface potential meter. The results are shown in Table 1.

The measurement was carried out three times, and the evaluation was made based on the average value thereof.

As shown in Table 1, it was revealed that by using the conductive Teflon tube, charging of the water caused by liquid feeding could be prevented. Even when the conductive Teflon tube is used as the reactor unit of the flow reactor, the above result can be similarly reproduced by the antistatic effect possessed by the conductive Teflon tube.

Comparative Example 1

In the same manner as in Example 1 except that the conductive Teflon tube 41 was replaced with a flow channel (hereinafter referred to as "Teflon tube having no conductivity"; volume resistivity: >$10^{10}$ Ω·m; inner diameter: 2.0 mm×outer diameter: 3.0 mm×length: 2.6 m) that was formed only of PFA and had a cross-section of a single-layer structure, the surface potential of the water stored in the disposable cup 42 was measured by a surface potential meter. The results are shown in Table 1. The measurement was carried out three times, and the evaluation was made based on the average value thereof.

As shown in Table 1, it was revealed that when using the Teflon tube having no conductivity, charging of the water caused by liquid feeding could not be prevented.

TABLE 1

|  | volumetric flow rate [L/min] | flow rate [m/s] | liquid feed amount [L] | surface potential [kV] |
| --- | --- | --- | --- | --- |
| Example 1 | 0.50 | 2.65 | 1.50 | 0.00 |
| Comparative Example 1 | 0.50 | 2.63 | 1.50 | 0.32 |

DESCRIPTION OF REFERENCE NUMERALS 1a, 1b, 11a, 11b: raw material feeding unit
2: mixing unit
3: reactor unit
4a, 4b, 14a, 14b: raw material storage container
5a, 5b, 15a, 15b: liquid feeding control unit
6: reaction liquid storage container
12: premixer
31: reactor unit wound in the shape of a spiral or coil
32: reactor unit with several bent backs
41: conductive Teflon tube or Teflon tube having no conductivity
42: disposable cup
70: fluororesin containing a conductive filler
71: second resin (excluding the fluororesin containing the conductive filler)

The invention claimed is:
1. A flow reactor, comprising:
a plurality of raw material feeding units;
a mixing unit configured to mix raw materials fed from the raw material feeding units; and
a reactor unit in which a mixed solution prepared in the mixing unit flows,
wherein at least a part of an inner wall of the reactor unit is formed of a fluororesin comprising a conductive filler, and
wherein the reactor unit comprises a flow channel having an equivalent diameter of from 1.0 mm to 20 mm.

2. The flow reactor according to claim 1, wherein the reactor unit comprises a single-layer structure comprising the fluororesin.

3. The flow reactor according to claim 1, wherein a quenching agent capable of quenching the mixed solution is in contact with an outer wall surface of the reactor unit.

4. The flow reactor according to claim 3, wherein the quenching agent comprises at least one selected from the group consisting of water, hydrochloric acid, sulfuric acid, phosphoric acid, acetic acid, citric acid, sodium hydroxide, potassium carbonate, sodium hydrogen carbonate, hydrogen peroxide, sodium hypochlorite, sodium chlorite, sodium thiosulfate, and sodium sulfite.

5. The flow reactor according to claim 1, wherein the fluororesin is a homopolymer or a copolymer produced from a fluorine atom-containing monomer.

6. The flow reactor according to claim 1, wherein the conductive filler is at least one selected from the group consisting of a carbon-based filler, a metal-based filler, a metal oxide-based filler, and a metal alloy-based filler.

7. The flow reactor according to claim 6,
wherein
the carbon-based filler comprises at least one selected from the group consisting of carbon black, ketjen black, acetylene black, carbon nanotubes, natural graphite, artificial graphite, and vapor-grown carbon fibers,
the metal-based filler comprises at least one selected from the group consisting of gold, silver, nickel, copper, zinc, aluminum, and stainless steel,
the metal oxide-based filler comprises at least one selected from the group consisting of aluminum-doped zinc oxide, antimony-doped tin oxide (IV), and tin-doped indium oxide (III), and
the metal alloy-based filler comprises at least one selected from the group consisting of AgCu, AgSn, CuZn, CuNiZn, and CuNi.

8. The flow reactor according to claim 1, wherein the fluororesin has a volume resistivity, measured under the conditions of 50% RH and 23° C. in accordance with JIS K 6911, of $10^6$ Ω·m or less.

9. The flow reactor according to claim 1, further comprising a temperature control unit.

10. The flow reactor according to claim 1, wherein the reactor unit has a tube shape.

11. The flow reactor according to claim 1, wherein the fluororesin comprises at least one selected from the group consisting of polytetrafluoroethylene (PTFE), polychlorotrifluoroethylene (PCTFE), perfluoroethylene propene copolymer (FEP), perfluoroalkoxyalkane (PFA), ethylene-chlorotrifluoroethylene copolymer (ECTFE) and ethylene-tetrafluoroethylene copolymer (ETFE).

12. The flow reactor according to claim 1, wherein the fluororesin comprises at least one selected from the group consisting of polytetrafluoroethylene (PTFE), perfluoroethylene propene copolymer (FEP), and perfluoroalkoxyalkane (PFA).

13. The flow reactor according to claim 1, wherein the conductive filler has a sphere shape having an average particle size of at least 5 nm, or a needle shape having an aspect ratio of at least 5.

14. The flow reactor according to claim 1, wherein a content of the conductive filler in the fluororesin is at least 5 parts by weight based on 100% by weight of the fluororesin.

15. The flow reactor according to claim 1, wherein a content of the conductive filler in the fluororesin is from 7 to 30 parts by weight based on 100% by weight of the fluororesin.

16. The flow reactor according to claim 1, wherein an outer wall surface of the reactor unit is covered with a second resin.

17. The flow reactor according to claim 1, wherein an equivalent diameter of a flow channel of the reactor unit changes in the middle of the reactor unit.

18. A method for mixing raw materials comprising a liquid having a conductivity of less than 50 pS/m, the method comprising:
mixing raw materials in the flow reactor of claim 1.

* * * * *